United States Patent
Jayant et al.

[11] Patent Number: 5,933,151
[45] Date of Patent: Aug. 3, 1999

[54] SIMULATED NATURAL MOVEMENT OF A COMPUTER-GENERATED SYNTHESIZED TALKING HEAD

[75] Inventors: Nuggehally Sampath Jayant, Gillette; Jialin Zhong, Berkeley Heights, both of N.J.

[73] Assignee: Lucent Technologies Inc., Murray Hill, N.J.

[21] Appl. No.: 08/824,386

[22] Filed: Mar. 26, 1997

[51] Int. Cl.⁶ ................................................. G06F 15/00
[52] U.S. Cl. ................................................. 345/473
[58] Field of Search .................................. 345/473, 474, 345/475, 435

[56] References Cited

U.S. PATENT DOCUMENTS

| | | | |
|---|---|---|---|
| 5,590,261 | 12/1996 | Sclaroff et al. | 395/173 |
| 5,818,461 | 10/1998 | Rouet et al. | 345/473 |

*Primary Examiner*—Phu K. Nguyen

[57] ABSTRACT

A method for simulating natural movement of a computer-generated synthesized talking head using an N-state Markov model. Initially, the number of states N is set representing N different positional orientations of the synthesized talking head. The transitions from each possible current position to each possible next position of the talking head are identified with a set of transitional probabilities in a range from zero to one. A uniformly distributed random number is generated and the state identified by the transition probabilities associated with the random number identifies the next position of the talking head. The synthesized talking head is rotated to that next position and remains there for a durational time period before transitioning to a next position which is probabilistically determined in like manner. To further simulate realistic head movement, the synthesized head may be programmed to remain in a particular state or position for an extended period of time at the end of a sentence of simulated speech.

10 Claims, 2 Drawing Sheets

SIMULATED NATURAL MOVEMENT OF A COMPUTER-GENERATED SYNTHESIZED TALKING HEAD

BACKGROUND OF THE INVENTION

1. Field of the Invention

The present invention is related to a computer-generated synthetic talking head model and, in particular, to such a simulation for use with visual speech synthesis.

2. Description of Related Art

Research in psychology has revealed that humans perceive both acoustic and visual signals during face-to-face communications. These visual cues improve speech recognition. The use of such visual information has led to the development of visual speech synthesis, also known as a "talking head", in which a computer-generated synthesized facial image with speech articulators is configured in synchronization with synthetic acoustic speech. Visual speech synthesis can assist listeners in understanding synthetic acoustic speech, and has a wide diversity of applications including video conferencing, artificial agents for human-machine interaction, and speech training for the hearing impaired.

Visual information can be divided into two classes: that which includes speech-related facial motions which directly influence human bimodal (acoustic and visual) perception of speech, such as movements of the mouth and lips, as well as facial motions not directly related to the production of speech (referred to as "paralinguistic signals") such as facial expressions and head movements and gestures. Paralinguistic signals affect how humans accept the overall quality and realism of visual speech synthesis.

Heretofore, purely deterministic (cyclic) or purely random motion have commonly been used to simulate rotational movement of a synthesized talking head. A purely deterministic motion results, however, in predictable and thus unnatural rotational head movement. Random motion, on the other hand, is not predictable but produces abrupt rotational head movements which also appear unnatural. Thus, the overall quality of visual speech synthesis using such conventional methods is poor.

It is therefore desirable to simulate rotational movement of a synthesized talking head in a natural and realistic manner which is spontaneous, in that it is somewhat random, and which nevertheless provides relatively smooth movement. Moreover, the simulation of horizontal motion of the talking head should be adaptable for dynamic modification as a function of the number of listeners that speaker is addressing. Finally, the rotational movement of the synthesized head should simulate natural spans of sustained attention to particular sections of an audience.

SUMMARY OF THE INVENTION

The present invention is directed to a method for simulating natural movement of a computer-generated synthesized talking head using an N-state Markov model. Initially, the number of states is set representing different views or orientations of the synthesized talking head. The transitions from each possible current position to each possible next position are determined in accordance with a set of transitional probabilities. These transitional probabilities may be realized by partitioning or dividing a range of probabilities from zero to one. A uniform distributed random number is generated and the state corresponding to the partition into which the random number falls represents the next position. The synthesized talking head is rotated to the next position and remains there for a durational time period before transitioning to the next position. To further simulate realistic head movement, the synthesized head may be programmed to remain in a particular state or position for an extended period of time when the end of a sentence of spoken speech is detected.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views.

DETAILED DESCRIPTION

The present invention is most fundamentally based on the observation that people generally move their heads from side-to-side when they speak. Under different speaking scenarios, for example, one-on-one conversation, a group discussion, a lecture or speech in an auditorium, or a video conference, the speaker exhibits different patterns of rotational head motion. For instance, in a one-on-one conversation the movement of the head is negligible, if it moves at all, whereas in a group or auditorium setting the speaker will typically repeatedly move his or her head in order to address all sections or parts of the audience. The factors which characterize these instances of head movement include the range of head motion, the moving speed, and pause patterns. Another notable factor affecting the perceived quality of visual speech synthesis is the natural and realistic rotational movement—i.e. the perceived spontaneity of head motion. In order to appear spontaneous the rotational movement of the head must be continuous, non-repetitive and incorporate pauses related to speech segments.

Figure 1:
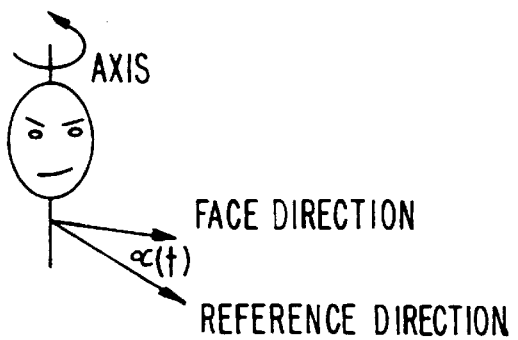
FIG. 1 diagrammatically depicts rotational movement of a synthesized talking head about an axis.

In the method of the present invention, rotational movement of the synthesized head is modeled as a rigid object rotating about an axis as shown in FIG. 1. A reference direction is set, for example, when the head is facing forward or at the viewer and the rotation of the head from that position is denoted by the relative angle $\alpha(t)$, where t is the time. Any known method or technique for generating a synthesized talking head may be used in the practice of the present invention, as for example that described in Cohen, Michael M. and Masaro, Dominic W., "Modeling Coarticulation in Synthetic Visual Speech", Models and Techniques in Computer Animation, Springer-Verlag, 1993, the entirety of which is incorporated herein by reference.

Rotational movement of the synthesized talking head in accordance with the invention is represented mathematically as an N-state Markov model. Thus, the present method is flexible in that it may accommodate and is suitable for use in virtually any type of speaking situation by simply adjusting the number of states, the angles associated with each state and the transitional probabilities associated with each state as a function of such factors as the size, nature and location of the audience.

Figure 2:
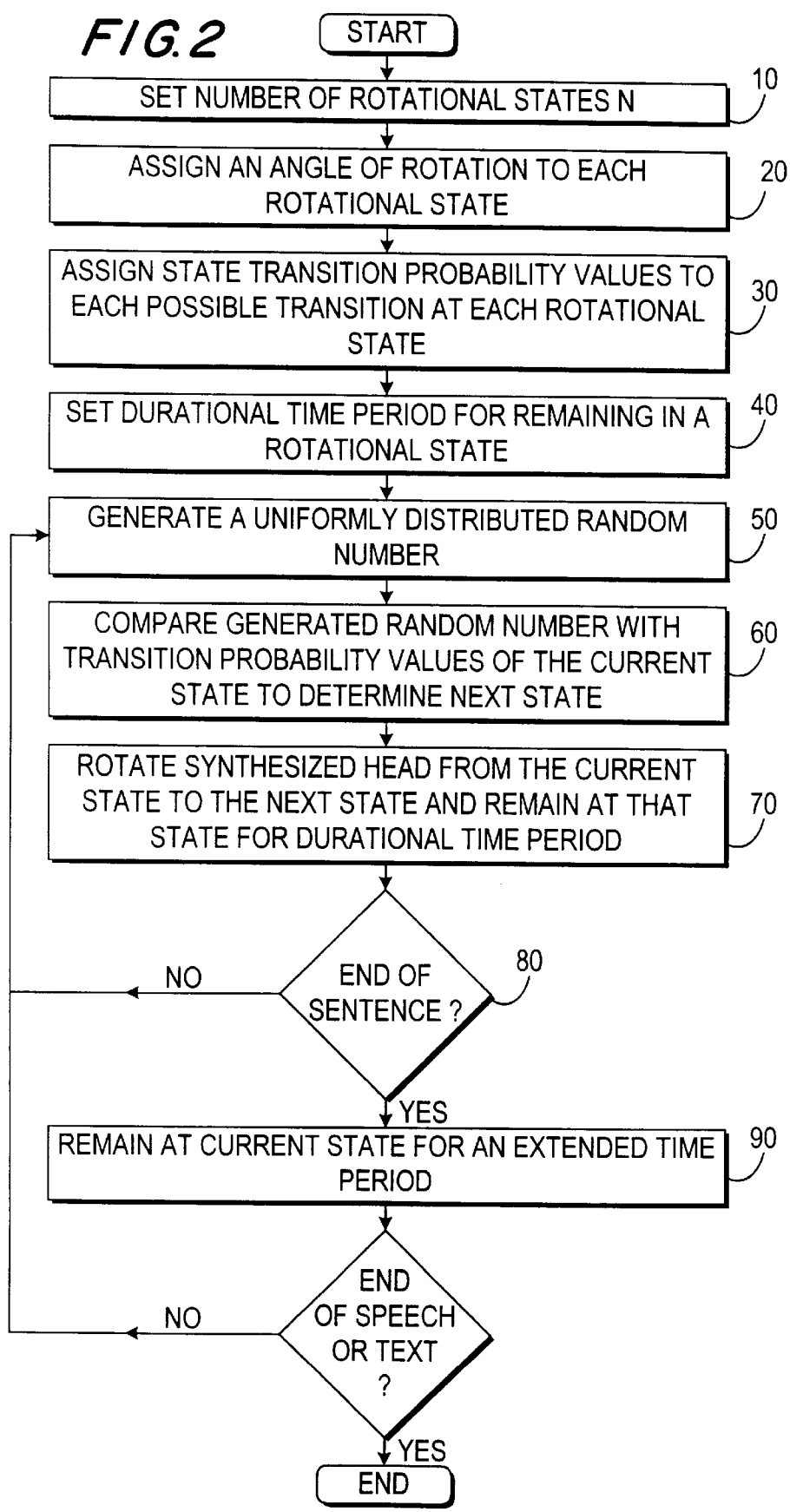
FIG. 2 is a flow chart of the process for simulating natural rotational movement of a synthesized talking head in accordance with the present invention.

An embodiment of the present inventive method for simulating natural rotational movement of a synthesized talking head is represented by the flow chart of FIG. 2. Spontaneous or natural rotational movement of the talking head is simulated using a set of N rotational states, $\alpha_i$, where i=1, ..., N. In block 10 the number of rotational states of head movement is set in accordance with the particular talking scenario with which use of the talking head is intended. The general states as represented by the N-Markov model comprise a dominant state, secondary states and intermediate states. Typically, the dominant state is set as the full-face frontal view. The secondary states are defined, if at all, as the outer limits or boundaries of the range of angular rotation. Any number of intermediate states, or none at all, may be set between the dominant and secondary states to smooth transitions between the dominant and secondary states.

In some situations, such as when the person speaking is a newscaster or videophone user, rotational head movement by the speaker is virtually nonexistent. However, during typical or normal one-on-one conversations there generally exists some degree of rotational movement of the head, albeit less than that when speaking to a group or audience. Consequently, the appropriate number of rotational states is selected in accordance with the situation being simulated so that, generally, the larger the audience the greater the number of states. By rotating the synthesized head between the various states the audience is given the impression that the speaker is addressing different sections of the audience. The greater the number of states, the less predictable the resulting rotational head movements. On the other hand, the smaller the number of states, the more predictable and unnatural do the rotational movements of the talking head appear.

Once the number of states has been set, in block 20 an angle of rotation is assigned to each state to thereby define a range of rotational movement. Each state is set to a desired rotational position or angle relative to the reference direction as shown in FIG. 1; the various rotational positions represent different rotated views of the talking head. For instance, a dominant state position may be set as a full-face frontal view with secondary states corresponding to left and right three-quarter views of the full-face frontal view. Intermediate states positioned so as to represent left and right one-quarter views of the full-face frontal view, for example, may also be defined between the dominant and secondary states in order to make the transitions smoother. In accordance with the invention, the rotational positioning of the states may be symmetrical or asymmetrical. If only a single state is defined then, as will be clear, the synthesized head will not rotate at all. An infinite number of transition state combinations are possible and may be defined.

In block 30 transition probability values representing the probability of transitioning between the various states are defined. These probabilities are represented mathematically as an N×N state transition probability matrix $P=\{p_{ij}\}$, where $0 \leq p_{ij} \leq 1.0$, and i,j=1, ..., N are the conditional probabilities of moving from a current rotational state j to a next rotational state i. The probabilities at each state satisfy the condition $$\sum_{j=0}^{N} p_{ij} = 1.0$$

Thus, the sum of the transition probabilities in each column of the matrix is 1.0. In a one-on-one situation with a center state representing a full-face frontal view, for example, a relatively small number of states may be used spanning a relatively narrow range of rotating angles and the transition probabilities will be defined so that the probability of transitioning from a current state to the center state is higher than the probability of transitioning to any other state. On the other hand, in a one-on-many scenario with a relatively large number of states encompassing a relatively wide range of rotating angles the transition probabilities may, for example, be defined so that the probability of transitioning from a current state to any other state is approximately the same.

Figure 3:
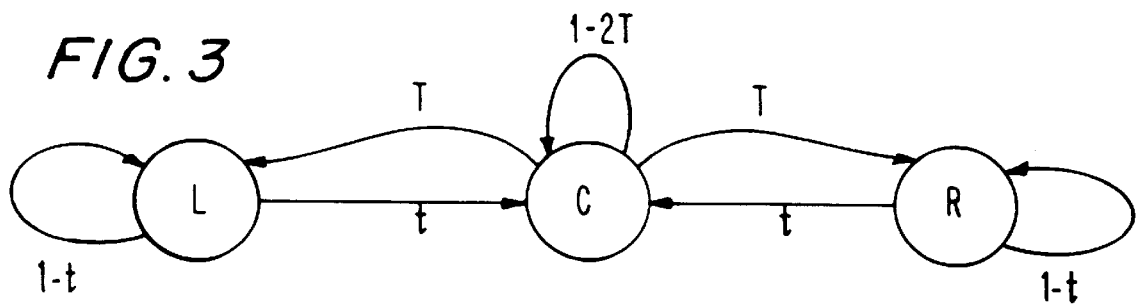
FIG. 3 diagrammatically depicts a three-state transition map in accordance with the present invention.

It should be understood that the following representative examples of various N-state Markov models and the state transition probabilities defined in accordance with the invention are described for illustrative purposes only. A transition map for a 3-state Markov model is shown in FIG. 3 representing the states for the left (L), center (C) and right (R) views of the talking head without any intermediate states between the center and each of the left and right states. Specific positions may be assigned to these states so as to represent, for example, a left three-quarters view, a full-face frontal view and a right three-quarters view, respectively. The state transition probability matrix for such a 3-state Markov model may be defined by the matrix $$\{p_{ij}\} = \begin{vmatrix} 1-t & T & 0 \\ t & 1-2T & t \\ 0 & T & 1-t \end{vmatrix} \quad (1)$$

where T and t denote particular numeric transition probabilities.

The state probabilities for the 3-state model are $Pr(C)=t/(t+2T)$ and $$Pr(R)=Pr(L)=T/(t+2T) \quad (2)$$

where C, R and L denote the center, right and left states, respectively. For example, if T=⅛ and t=¼, then Pr(C)=0.5 and Pr(R)=Pr(L)=0.25.

Figure 4:
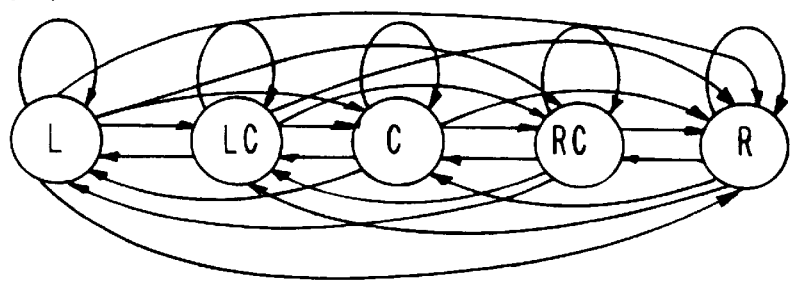
FIG. 4 diagrammatically depicts a five-state transition map in accordance with the present invention.
Figure 5:
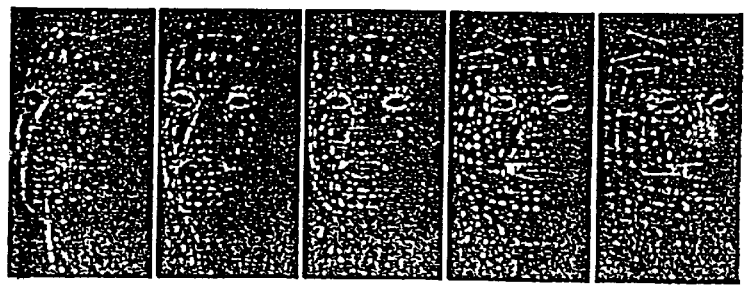
FIG. 5 shows the rotated views of the synthesized head in each of the rotational states of FIG. 4.

One-to-many discourse may be represented, by way of example, as a five-state Markov model as depicted by the transition map shown in FIG. 4. FIG. 5 depicts the rotated views of the synthesized head at each of the five states of FIG. 4. The state transition probability matrix for this five-state Markov model may, by way of example, be $$\{p_{ij}\} = \begin{vmatrix} 0.6 & 0.05 & 0.0 & 0.0 & 0.0 \\ 0.15 & 0.65 & 0.15 & 0.13 & 0.05 \\ 0.2 & 0.17 & 0.7 & 0.17 & 0.2 \\ 0.05 & 0.13 & 0.15 & 0.65 & 0.15 \\ 0.0 & 0.0 & 0.0 & 0.05 & 0.6 \end{vmatrix} \quad (3)$$

Each possible current rotational state of the synthesized head is represented by the various columns of the state transition probability matrix and the rows of the matrix represent the various possible next rotational states. Thus, if the current rotational state of the talking head is the left state (L), then:

0.6 represents the probability that the head will remain in the left state;

0.15 represents the probability that the head will transition from the left state to the left-center intermediate state;

0.2 represents the probability that the head will transition from the left state to the center state; and 0.05 represents the probability that the head will transition from the left state to the right-center intermediate state.

The head will never directly transition from the left state to the right state, as indicated by the assignment of that probability to a value of zero.

In step 40, a durational time period, denoting the time that the head will remain or stay in the next following rotational state, is set. Thus, once the talking head is rotated from its current rotational state to the next rotational state, it will remain in that next rotational state for the durational time period set in step 40 before transitioning to still another rotational state.

A uniformly distributed random number RN is generated in step 50 for use in determining the next rotational state. In step 60 a comparison is made between the generated random number (from step 50) and the transition probabilities (stored in the probability matrix) assigned to the current state column of the matrix in order to determine the next rotational state. Then, in step 70, the synthesized head is rotated from the current rotational state to the next rotational state in accordance with the results of the comparison of step 60 and remains in the next rotational state for the durational time period set in step 40.

The comparison of step 60 compares the value of the random number RN generated at step 50 with the partial sums that are obtained by adding, for the particular probability matrix column associated with the current head position or state, each probability value with the probability value(s) in the rows above that each probability value. In effect, a new matrix—herein referred to as to partial sums matrix—is developed and it is with the partial sum numbers in that new matrix that the random number RN is compared to determine the next position or state of the simulated talking head. With reference, by way of example, to the leftmost column (representing a head currently positioned in the leftmost rotational state) in the five-state probability matrix shown in Equation 3 hereinabove, the numbers to be compared to the generated random number RN for the purpose of identifying the next position to which the talking head is to be advanced—i.e. the numbers that will appear in the leftmost column of the partial sums matrix—are, reading down the leftmost column, 0.6, 0.75, 0.95, 1.0 and 1.0. Illustratively, the partial sum number 0.95 for the third row in the first (leftmost) column is obtained by adding the probability value which is at that position in the probability matrix—i.e. 0.2—to the probability values in the rows above that position in the same column—i.e. 0.6 (first row) and 0.15 (second row)—to obtain the partial sum 0.95 for that third row, leftmost column position. The partial sums matrix for the probability matrix shown in Equation 3 is thus:

$$\{p_{ij}\} = \begin{vmatrix} 0.6 & 0.05 & 0.0 & 0.0 & 0.0 \\ 0.75 & 0.7 & 0.15 & 0.13 & 0.05 \\ 0.95 & 0.87 & 0.85 & 0.3 & 0.25 \\ 1.0 & 1.0 & 1.0 & 0.95 & 0.4 \\ 1.0 & 1.0 & 1.0 & 1.0 & 1.0 \end{vmatrix}$$

Each partial sum represents a range between that number and the partial sum number in the same column and the immediately preceding (immediately above) row. The random number generated at step 50 is compared to these ranges defined by the partial sums to determine the range into which the random number falls and, thereby, the next position or state to which the talking head will be transitioned from the current position or state.

Thus, using that 5-state Markov model of FIG. 4 and the state transition probability matrix of Equation 3, with the head initially or currently positioned at the left rotational state, the random number RN generated at step 50 is compared at step 60 to determine the next rotational state with the following results:

if $0.0 < RN \leq 0.6$, then the head will remain in the left state for the durational time period;

if $0.6 < RN \leq 0.75$, then the head will transition from the left state to the left-center state and remain there for the durational time period;

if $0.75 < RN \leq 0.95$, then the head will transition from the left state to the center state and remain there for the durational time period; and if $0.95 < RN \leq 1.00$, then the head will transition from the left state to the right-center state and remain there for the durational time period.

Through observation of real discourse among live speakers it has also been recognized that a speaker generally pauses at the end of each sentence for a short period of time before beginning the next sentence. Thus, in order to improve the overall quality or naturalness of synthesized talking heads, rotational movement of the synthesized head may be synchronized with the acoustic speech simulated by the talking head, with an additional pause being introduced at the end of each sentence to cause the talking head to remain in the current state for an extended period of time before transitioning to a next state when the next sentence begins. Thus, and with continued reference to FIG. 2, in step 80 a determination is made as to whether the speech or text ends a sentence. If not then another random number for use in determining the next following particular state is generated in step 50 and the process continues. If, on the other hand, the speech or text is the end of or ends a sentence then, in accordance with the invention and as shown in step 90, the synthesized head remains at the current state for an extended time period. In step 100, if after the extended period has elapsed additional speech or text is to be simulated, then a new random number for use in determining the next head position is generated in step 50 and the process continues; otherwise the simulated head movement stops when the actual speech or text ends.

For illustrative purposes, a set of simulated rotational movements of a synthesized head in accordance with the inventive method will now be described using the five-state Markov model shown in FIG. 4 and the state transition matrix of Equation 3. Initially the number of states is set (step 10) to five and the rotating angles of the five states are assigned (step 20) to correspond to a center state representing a full-face frontal view, a right state representing a right side three-quarters view, a left state representing a left side three-quarters view, a right-center state representing a right side one-quarter view, and a left-center state representing a left side one-quarter view. The durational time period for remaining at a state is set (step 40) to 200 ms.

The synthesized head starts from the center state. If a random number RN of 0.9 is generated, the synthesized head is rotated from the center state to the right-center state and remains there for 200 ms. After the 200 ms period has elapsed, another random number 0.44 is generated and the synthesized head thus remains in the right-center position or state for an additional 200 ms. If while positioned at the right-center position the end of a sentence is reached, then the time for the head to remain in that position is extended for an additional 300 ms. A new random number 0.02 is then generated and at the end of the 300 ms extension, the synthesized head transitions from the right-center state to the left-center state as the next sentence begins. This process similarly continues for so long as the synthesized head simulates acoustic speech, i.e. until the end of the actual speech or text.

As should by now be apparent, the particular Markov models, transition maps and state transition probability matrices herein shown and described have been presented for illustrative purposes only and are not intended to limit the scope of the invention. Moreover, although only one-dimensional movement (i.e. horizontal rotation) of the synthesized talking head is described and shown, the method of the present invention may be readily modified or adapted to simulate any type of multi-dimensional head movement, as for example two-dimensional and three-dimensional head motion. For that purpose, each state may for example be defined two-dimensionally with coordinates corresponding to the x and y axes or y and z axes or x and z axes to simulate any combination of vertical and horizontal head movements. Such vertical head motion may likewise appropriately correspond with the acoustic speech produced by the synthesized talking head. Three-dimensional movement may similarly be provided by defining each positional state of the head as a function of its coordinates along the x, y and z axes.

It should also be noted that although the present method has been described and shown using a particular set of transition probability values assigned to each of the positional states, these transition probability values may be determined or defined through experimentation through observation of real life speaking situations. For example, the transition probability values may be determined by recording and analyzing the actual head movements of participants engaged in particular speaking situations, as for example a roundtable discussion, over an extended period of time.

Thus, while there have been shown and described and pointed out fundamental novel features of the invention as applied to certain embodiments thereof, it will be understood that various omissions and substitutions and changes in the form and details of the inventive methods and method steps illustrated may be made by those skilled in the art without departing from the spirit of the invention. For example, it is expressly intended that all combinations of those method steps which perform substantially the same function in substantially the same way to achieve the same results are within the scope of the invention. It is the intention, therefore, to be limited only as indicated by the scope of the claims appended hereto.

We claim:

1. A method for simulating natural movement of a computer-generated synthesized talking head by moving the synthesized talking head between a plurality of states each representing a different orientation of the synthesized talking head, comprising the steps of:

(a) generating a uniformly distributed random number;

(b) comparing the generated random number with a set of transitional probability ranges, each said probability range being associated with a particular one of the plural states and representing a probability that the talking head will transition from a current state to the particular state, to identify in said comparison the probability range containing the generated random number and, thereby, the particular state to which the talking head will transition from the current state; and (c) moving the synthesized talking head from the orientation of the current state to the orientation of the particular state in accordance with said comparison; and (d) after said step (c), repeating said steps (a), (b) and (c) for so long as the talking head continues to simulate speech.

2. The method of claim 1, wherein step (c) further comprises a step (e) of maintaining the talking head in the orientation of the particular state for at least a durational time period before transitioning the talking head to another state.

3. The method of claim 2, wherein said step (e) further comprises maintaining the talking head in the orientation of the particular state for an extended time period in addition to said durational time period before transitioning the talking head to another state when the simulated speech denotes a sentence end.

4. The method of claim 1, wherein the different orientations comprise different rotated views in a substantially horizontal plane of the synthesized talking head.

5. The method of claim 4, wherein said step (b) further comprises the step of assigning an angle of rotation in the substantially horizontal plane to the different orientations.

6. The method of claim 1, wherein the set of transition probability ranges is represented as an N×N matrix, for N different orientations.

7. The method of claim 6, wherein each column of the matrix represents a possible current orientation of the talking head and each row of the matrix represents a possible next orientation of the talking head.

8. The method of claim 7, wherein a sum of the transition probability ranges in each said column of the matrix is 1.0.

9. The method of claim 1, further comprising the step (f) of defining a state transition probability matrix comprising a plurality of transition probability values each representing a probability of transitioning of the talking head between two of the plural states, said plural transition probability values being arranged in a plurality of columns each associated with the current state of the talking head and a plurality of rows each associated with one of the plural states into which the talking head may transition from the current state.

10. The method of claim 9, further comprising the step (g) of defining from said state transition probability matrix a partial sums matrix comprising partial sums derived from the transition probability values in the state transition probability matrix, said partial sums defining the transitional probability ranges with which the generated random number is compared.

* * * * *